(12) United States Patent
Puiu et al.

(10) Patent No.: US 8,939,858 B2
(45) Date of Patent: Jan. 27, 2015

(54) ELECTRICALLY VARIABLE DRIVE UNIT

(71) Applicants: Dumitru Puiu, Sterling Heights, MI (US); Goro Tamai, West Bloomfield, MI (US); Dale E Martin, Novi, MI (US)

(72) Inventors: Dumitru Puiu, Sterling Heights, MI (US); Goro Tamai, West Bloomfield, MI (US); Dale E Martin, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 139 days.

(21) Appl. No.: 13/687,730

(22) Filed: Nov. 28, 2012

(65) Prior Publication Data

US 2013/0150198 A1 Jun. 13, 2013

Related U.S. Application Data

(60) Provisional application No. 61/569,552, filed on Dec. 12, 2011.

(51) Int. Cl.
  *F16H 3/72* (2006.01)
  *F16H 37/06* (2006.01)
  *B60K 6/365* (2007.10)
  *B60K 6/40* (2007.10)
  *B60K 6/445* (2007.10)
  *F16H 37/08* (2006.01)

(52) U.S. Cl.
  CPC .............. *F16H 37/065* (2013.01); *B60K 6/365* (2013.01); *B60K 6/40* (2013.01); *B60K 6/445* (2013.01); *F16H 3/727* (2013.01); *F16H 3/728* (2013.01); *F16H 2037/0866* (2013.01); *F16H 2200/201* (2013.01); *F16H 2200/2097* (2013.01); *F16H 2037/0873* (2013.01); *F16H 2200/2035* (2013.01); *F16H 2200/2007* (2013.01); *F16H 2200/2023* (2013.01); *Y02T 10/6239* (2013.01)
  USPC .............................. 475/5; 475/275; 475/317

(58) Field of Classification Search
  CPC ........... F16H 3/72; F16H 3/727; F16H 3/728; F16H 37/065
  USPC .............................................. 475/5, 275, 317
  See application file for complete search history.

(56) References Cited

U.S. PATENT DOCUMENTS

| 5,558,595 | A | 9/1996 | Schmidt et al. | |
| 2005/0159264 | A1* | 7/2005 | Puiu et al. | 475/198 |
| 2006/0065070 | A1* | 3/2006 | Puiu | 74/664 |
| 2006/0183588 | A1 | 8/2006 | Schmidt et al. | |
| 2007/0042853 | A1* | 2/2007 | Kim | 475/5 |
| 2007/0254761 | A1 | 11/2007 | Kim | |
| 2008/0076615 | A1* | 3/2008 | Kim | 475/5 |
| 2011/0059824 | A1 | 3/2011 | Buannec et al. | |

FOREIGN PATENT DOCUMENTS

| JP | 2000127774 A | 5/2000 |
| JP | 2010036880 A | 2/2010 |

OTHER PUBLICATIONS

International Search Report dated Feb. 21, 2013, for International Application No. PCT/US2012/066997, International Filing Date Nov. 29, 2012.

Written Opinion dated Feb. 21, 2013, for International Application No. PCT/US2012/066997, International Filing Date Nov. 29, 2012.

* cited by examiner

*Primary Examiner* — Edwin A Young
(74) *Attorney, Agent, or Firm* — Ralph E Smith

(57) ABSTRACT

An electrically variable drive unit having two electric motors is provided. The first electric motor is mounted along the same axis as an engine. The second electric motor is mounted along the same axis as a transmission output.

17 Claims, 8 Drawing Sheets

US 8,939,858 B2

ELECTRICALLY VARIABLE DRIVE UNIT

CROSS REFERENCE TO RELATED APPLICATION

This application claims the benefit of U.S. Provisional Ser. No. 61/569,552, filed Dec. 12, 2011.

FIELD

The present disclosure relates to an electrically variable drive unit and, more particularly, to an electrically variable drive unit having a first electric motor on a first axis and a second electric motor on a second axis.

BACKGROUND

Hybrid drive units featuring a combination of electric motors and a conventional internal combustion engine are becoming increasingly popular in modern automobiles. However, typical prior art hybrid drive units are often complex, bulky, and difficult to package within the engine bay of an automobile. Typical prior art hybrid drive units have many moving components and large electrical motors that take up space within the transmission housing. What is needed, therefore, is a hybrid drive unit with better packaging and a lower center of gravity to improve vehicle handling and performance. A hybrid drive unit having a simpler design than prior art hybrid drive units is also desirable.

SUMMARY

In one form, the present disclosure provides a drive unit including a transmission input shaft, an output shaft, a first electric motor coaxial with the transmission input shaft, and a second electric motor coaxial with the output shaft. The first electric motor and the input shaft are coupled to the second electric motor and the output shaft In another form, the present disclosure provides a hybrid transmission including a transmission input shaft, an output shaft, a first electric motor coaxial with the transmission input shaft, a second electric motor coaxial with the output shaft, and an input planetary gear set. The input planetary gear set includes an input carrier coupled to the transmission input shaft, a plurality of input pinion gears rotatably mounted on the input carrier, an input sun gear meshed with the plurality of input pinion gears and coupled to the first electric motor, and an input ring gear meshed with the plurality of input pinion gears and coupled to an output chain driver gear. The hybrid transmission also includes an electric motor planetary gear set including an electric motor carrier coupled to an output chain driven gear, a plurality of electric motor pinion gears rotatably mounted on the electric motor carrier, an electric motor sun gear meshed with the plurality of electric motor pinion gears and coupled to the second electric motor, and an electric motor ring gear meshed with the plurality of electric motor pinion gears and coupled to a transmission housing. The hybrid transmission further includes an output planetary gear set including an output sun gear coupled to the output chain driven gear and the electric motor carrier, an output carrier coupled to the output shaft, a plurality of output pinion gears rotatably mounted on the output carrier and meshed with the output sun gear, and an output ring gear meshed with the plurality of output pinion gears. The output chain driver gear is coupled to the output chain driven gear.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
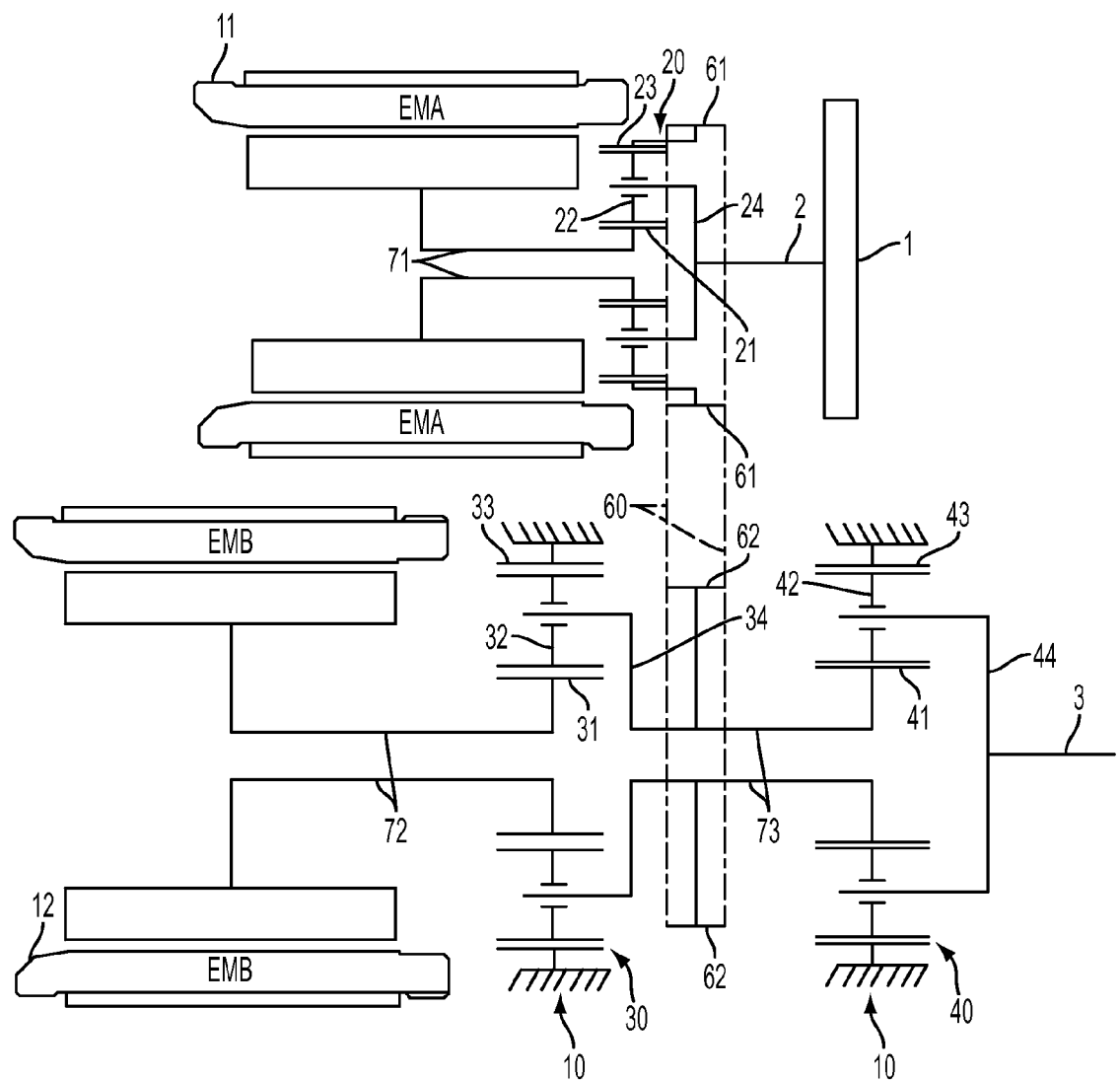
FIG. 1 is a schematic representation of an exemplary electrically variable drive unit according to the principles of the present disclosure.

FIG. 1 illustrates an example schematic representation of an exemplary electrically variable drive unit according to the principles of the present disclosure. An engine 1 is coupled to a transmission input shaft 2. The engine 1 may be any type of internal combustion engine or any other power source suitable for a vehicle. The transmission input shaft 2 is coupled to an input carrier 24 of an input planetary gear set 20. Input pinion gears 22 of the input planetary gear set 20 are rotatably mounted on the input carrier 24. The input pinion gears 22 are continuously meshed with an input sun gear 21 and an input ring gear 23 of the input planetary gear set 20. The input sun gear 21 is coupled by a shaft 71 to a first electric motor 11 ("EMA 11"). The engine 1 and EMA 11 are coaxial. The input ring gear 23 is coupled to an output chain driver gear 61.

Figure 5:
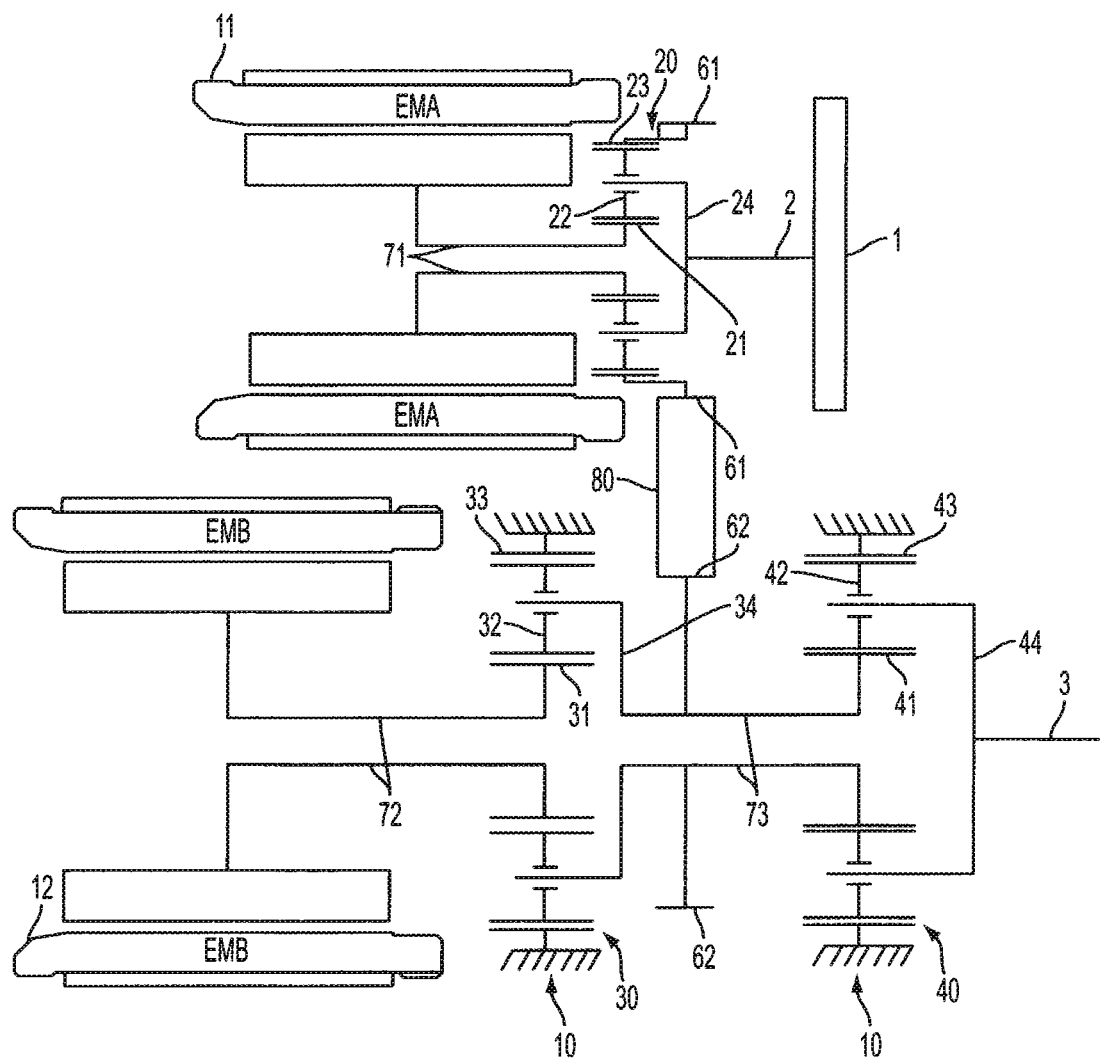
FIG. 5 is a schematic representation of yet another exemplary electrically variable drive unit according to the principles of the present disclosure.

A chain 60 couples the output chain driver gear 61 to an output chain driven gear 62. The chain 60 may be a belt or any other means of connecting the output chain driver gear 61 to the output chain driven gear 62. In one embodiment, the output chain driver gear 61 may be meshed with the output chain driven gear 62. In another embodiment, the output chain driver gear 61 may be coupled to the output chain driven gear 62 by a plurality of gears 80, as shown in FIG. 5.

The output chain driven gear 62 is coupled by a shaft 73 to an EMB carrier 34 of an EMB planetary gear set 30. EMB pinion gears 32 of the EMB planetary gear set 30 are rotatably mounted on the EMB carrier 34. The EMB pinion gears 32 are continuously meshed with an EMB sun gear 31 of the EMB planetary gear set 30 and an EMB ring gear 33 of the EMB planetary gear set 30. The EMB ring gear 33 is non-rotatably coupled to the drive unit housing 10. The EMB sun gear 31 is coupled by a shaft 72 to a second electric motor 12 ("EMB 12"). The shaft 73 coupled to the output chain driven gear 62 is also coupled to an output sun gear 41 of an output planetary gear set 40. In one embodiment, the output planetary gear set 40 is on a first side of the chain 60 and the EMB planetary gear set 30 is on a second side of the chain 60. Output pinion gears 42 of the output planetary gear set 40 are continuously meshed with the output sun gear 41 and an output ring gear 43 of the output planetary gear set 40. The output ring gear 43 is non-rotatably coupled to the drive unit housing 10. The output pinion gears 42 are rotatably mounted on an output carrier 44 of the output planetary gear set 40. The output carrier 44 is coupled to an output shaft 3. The output shaft 3 may be coupled to vehicle wheels, a differential, or to any other desired component. The output shaft 3 and EMB 12 are coaxial.

Figure 2:
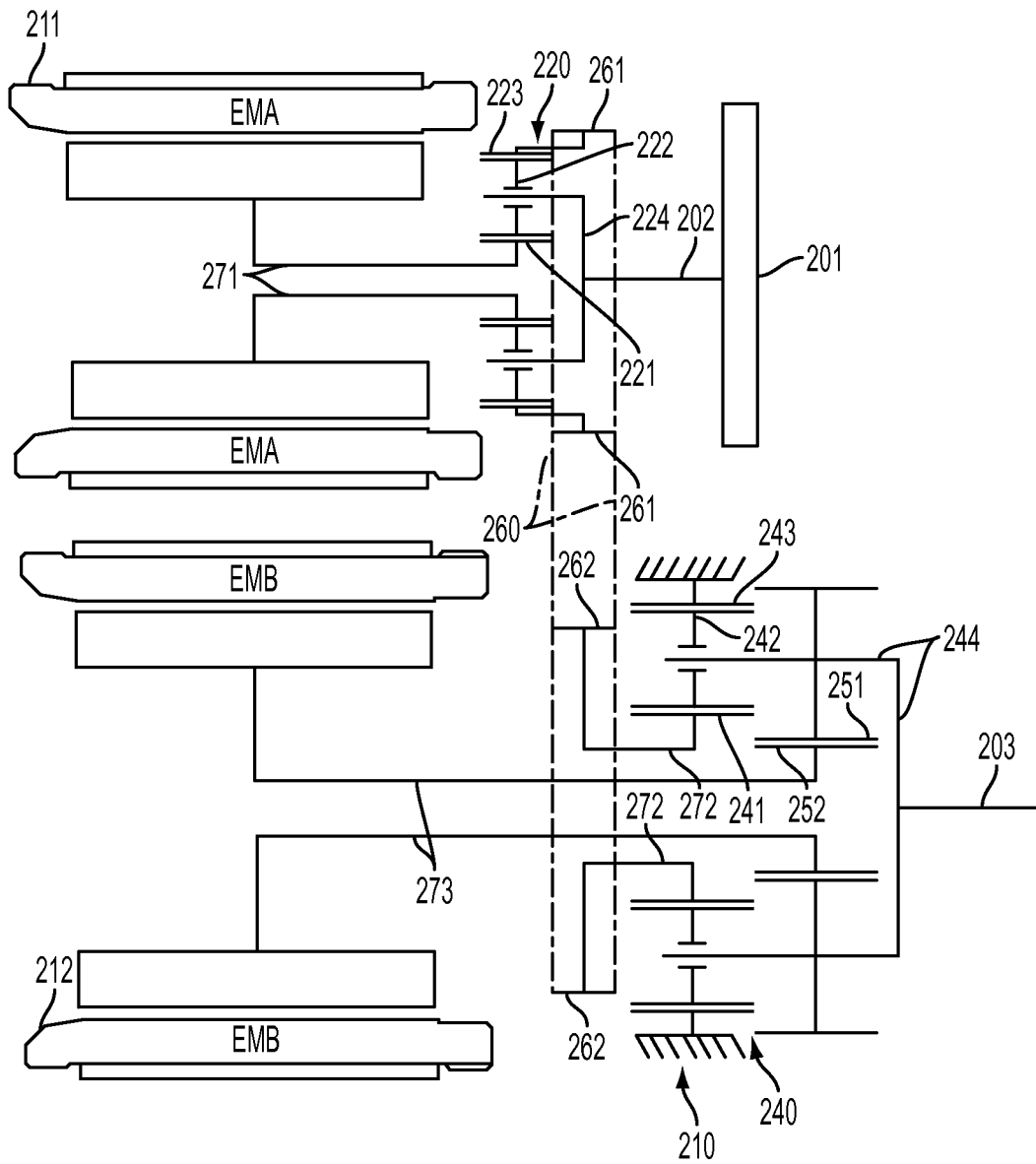
FIG. 2 is a schematic representation of another exemplary electrically variable drive unit according to the principles of the present disclosure.

FIG. 2 illustrates an example schematic representation of another exemplary electrically variable drive unit according to the principles of the present disclosure. An engine 201 is coupled to a transmission input shaft 202. The engine 201 may be any type of internal combustion engine or any other power source suitable for a vehicle. The transmission input shaft 202 is coupled to an input carrier 224 of an input planetary gear set 220. Input pinion gears 222 of the input planetary gear set 220 are rotatably mounted on the input carrier 224. The input pinion gears 222 are continuously meshed with an input sun gear 221 and an input ring gear 223 of the input planetary gear set 220. The input sun gear 221 is coupled by a shaft 271 to a first electric motor 211 ("EMA 211"). The engine 201 and EMA 211 are coaxial. The input ring gear 223 is coupled to an output chain driver gear 261.

Figure 6:
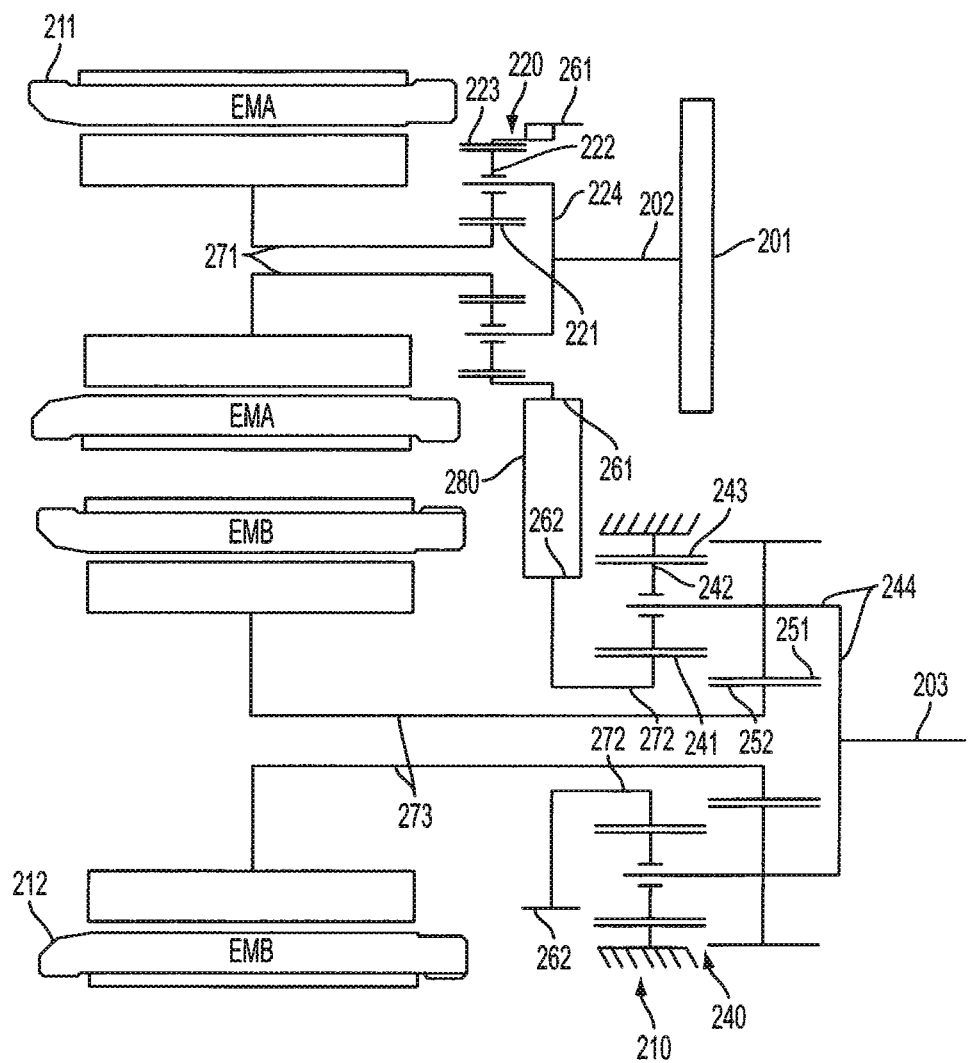
FIG. 6 is a schematic representation of yet another exemplary electrically variable drive unit according to the principles of the present disclosure.

A chain 260 couples the output chain driver gear 261 to an output chain driven gear 262. The chain 260 may be a belt or any other means of connecting the output chain driver gear 261 to the output chain driven gear 262. In one embodiment, the output chain driver gear 261 may be meshed with the output chain driven gear 262. In another embodiment, the output chain driver gear 261 may be coupled to the output chain driven gear 262 by a plurality of gears 280, as shown in FIG. 6.

The output chain driven gear 262 is coupled by a shaft 272 to an output sun gear 241 of an output planetary gear set 240. Output pinion gears 242 of the output planetary gear set 240 are continuously meshed with the output sun gear 241 and an output ring gear 243 of the output planetary gear set 240. The output ring gear 243 is non-rotatably coupled to the drive unit housing 210. The output pinion gears 242 are rotatably mounted on an output carrier 244 of the output planetary gear set 240. The output carrier 244 is non-rotatably coupled to an output driven gear 251. The output driven gear 251 is continuously meshed with an output driver gear 252 coupled by a shaft 273 to a second electric motor 212 ("EMB 212"). The output carrier 244 is also coupled to an output shaft 203. The output shaft 203 may be coupled to vehicle wheels, a differential, or to any other desired component. The output shaft 203 and EMB 212 are coaxial.

Figure 3:
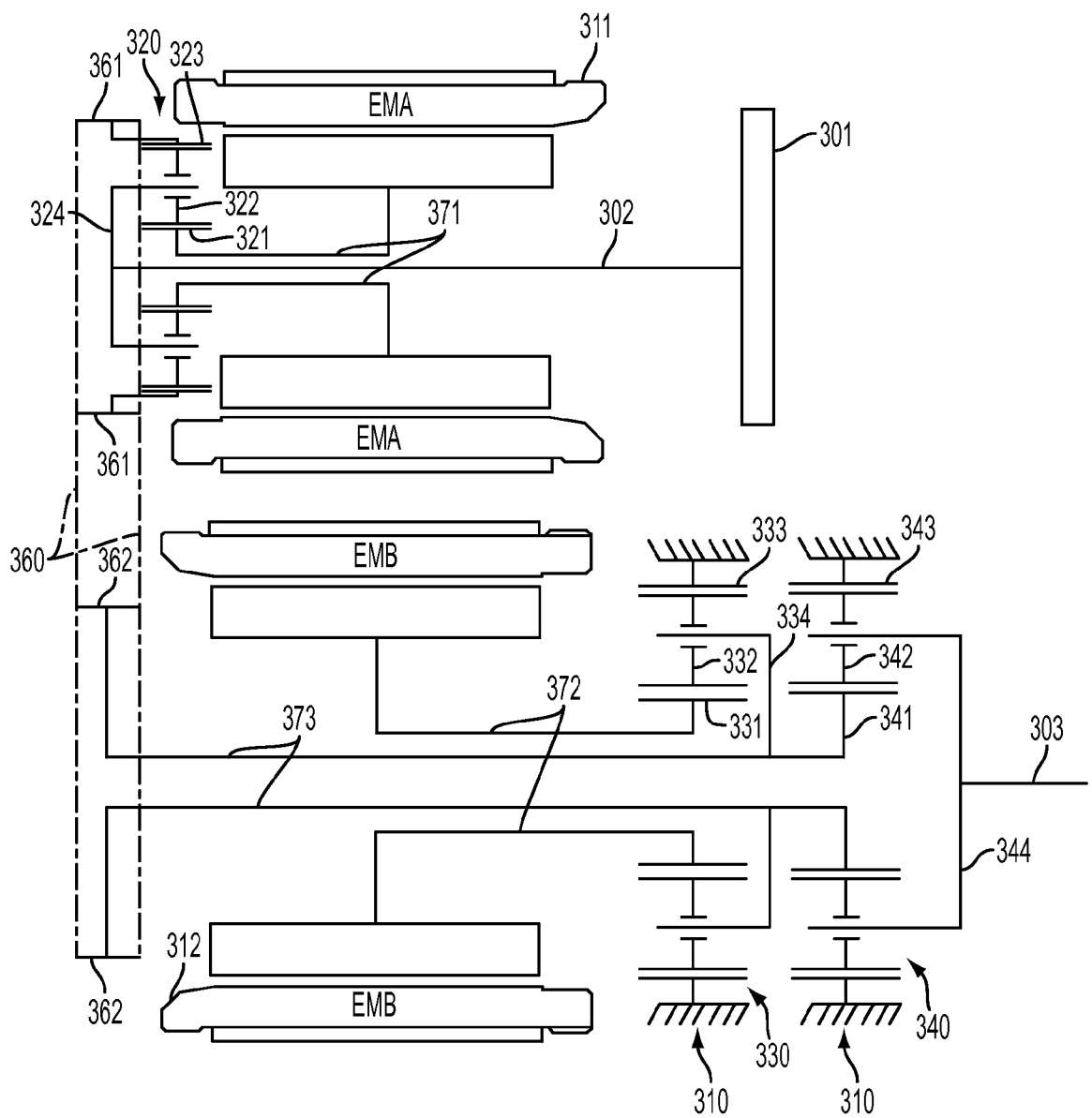
FIG. 3 is a schematic representation of another exemplary electrically variable drive unit according to the principles of the present disclosure.

FIG. 3 illustrates an example schematic representation of another exemplary electrically variable drive unit according to the principles of the present disclosure. An engine 301 is coupled to a transmission input shaft 302. The engine 301 may be any type of internal combustion engine or any other power source suitable for a vehicle. The transmission input shaft 302 is coupled to an input carrier 324 of an input planetary gear set 320. Input pinion gears 322 of the input planetary gear set 320 are rotatably mounted on the input carrier 324. The input pinion gears 322 are continuously meshed with an input sun gear 321 and an input ring gear 323 of the input planetary gear set 320. The input sun gear 321 is coupled by a shaft 371 to a first electric motor 311 ("EMA 311"). The engine 301 and EMA 311 are coaxial. The input ring gear 323 is coupled to an output chain driver gear 361.

Figure 7:
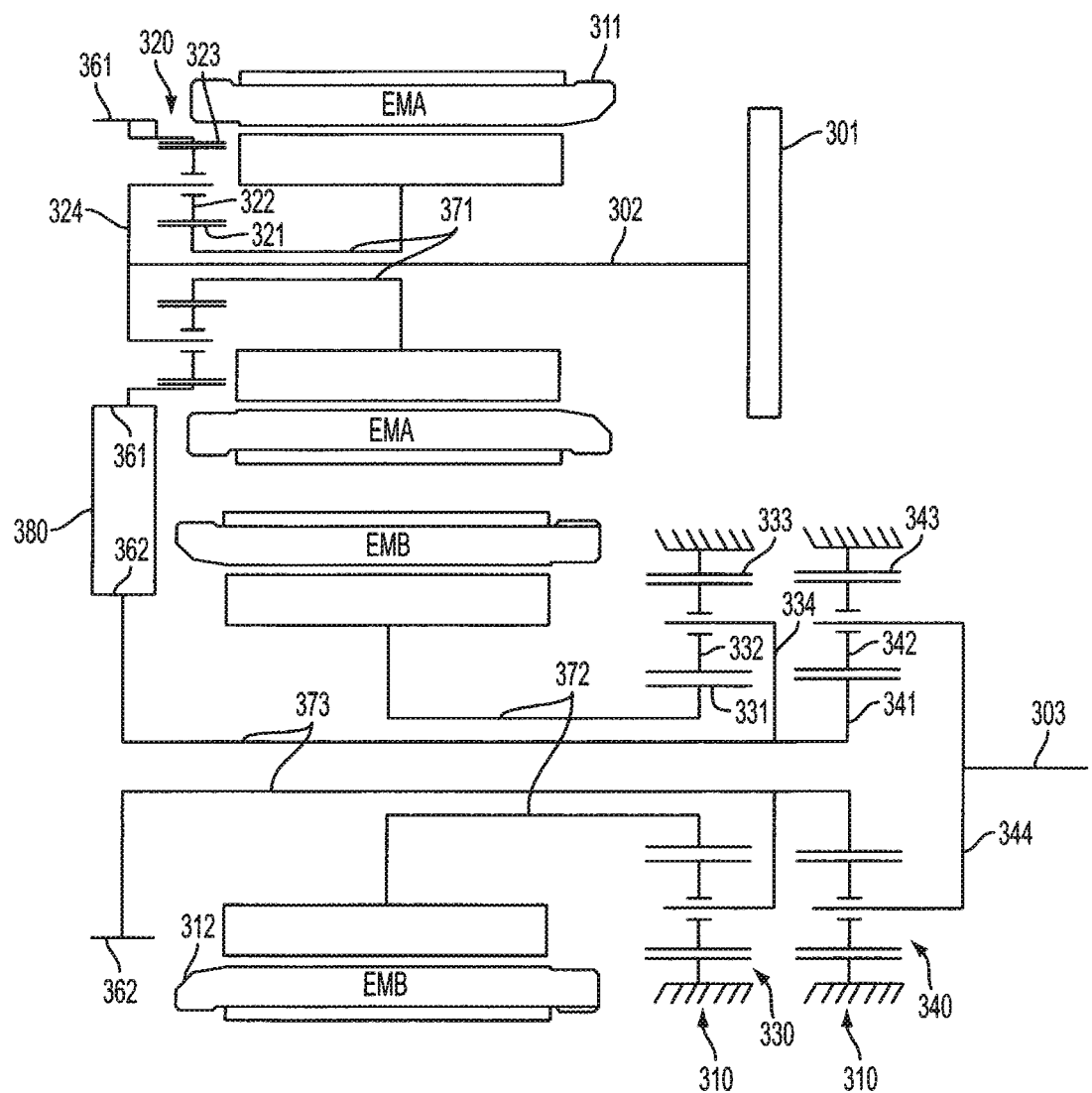
FIG. 7 is a schematic representation of yet another exemplary electrically variable drive unit according to the principles of the present disclosure.

A chain 360 couples the output chain driver gear 361 to an output chain driven gear 362. The chain 360 may be a belt or any other means of connecting the output chain driver gear 361 to the output chain driven gear 362. In one embodiment, the output chain driver gear 361 may be meshed with the output chain driven gear 362. In another embodiment, the output chain driver gear 361 may be coupled to the output chain driven gear 362 by a plurality of gears 380, as shown in FIG. 7.

The output chain driven gear 362 is coupled by a shaft 373 to an EMB carrier 334 of an EMB planetary gear set 330. EMB pinion gears 332 of the EMB planetary gear set 330 are rotatably mounted on the EMB carrier 334. The EMB pinion gears 332 are continuously meshed with an EMB sun gear 331 and an EMB ring gear 333 of the EMB planetary gear set 330. The EMB ring gear 333 is non-rotatably coupled to the drive unit housing 310. The EMB sun gear 331 is coupled by a shaft 372 to a second electric motor 312 ("EMB 312"). The shaft 373 coupled to the output chain driven gear 362 is also coupled to an output sun gear 341 of an output planetary gear set 340. In one embodiment, the output planetary gear set 340 and the EMB planetary gear set 330 are on the same side of the chain 360. Output pinion gears 342 of the output planetary gear set 340 are continuously meshed with the output sun gear 341 and an output ring gear 343 of the output planetary gear set 340. The output ring gear 343 is non-rotatably coupled to the drive unit housing 310. The output pinion gears 342 are rotatably mounted on an output carrier 344 of the output planetary gear set 340. The output carrier 344 is coupled to an output shaft 303. The output shaft 303 may be coupled to vehicle wheels, a differential, or to any other desired component. The output shaft 303 and EMB 312 are coaxial.

The drive unit of FIGS. 1-3 may be operated as purely electric drive unit in which EMB 12 provides propulsion ("EV mode") or as a parallel hybrid in which EMA 11 generates electricity or provides propulsion and EMB 12 and the engine 1 provide propulsion ("Parallel mode"). To operate the drive unit in the EV mode, EMB 12 is powered and rotates. EMA 11 is powered to rotate ("freewheel") at the RPM necessary to prevent the engine 1 from rotating. The rotation of EMB 12 and freewheeling of EMA 11 causes the output shaft 3 to rotate.

To operate the drive unit in the Parallel mode, the engine 1 is powered and rotates, thereby, causing the transmission input shaft 2 to rotate. Some power from the engine 1 passes to EMA 11, thereby, generating electricity to charge the drive unit's batteries and to power EMB 12. The remainder of the power from the engine 1 is transferred to the output chain driver gear 61 and, thereby, the output shaft 3. EMB 12 is powered and rotates, thereby, causing the output shaft 3 to rotate. In one embodiment, EMA 11 may also be powered to provide propulsive force.

In one embodiment, the center of gravity of the drive unit is reduced by configuring EMB 12 on the same axis as the output shaft 3. This may improve vehicle handling performance and packaging ability of the drive unit. In one embodiment, the layout of EMA 11 and EMB 12 enables packaging of power electronics on top of the drive unit when installed in a vehicle. In one embodiment, the gearing between EMB 12 and the output shaft 3 achieves a gear reduction from EMB 12 to the output shaft. The gear reduction improves the ability of EMB 12 to power to vehicle. In one embodiment the gear reduction between EMB 12 and the output shaft 3 is approximately 9:1. In one embodiment, the gear ratio may be higher or lower.

Figure 4:
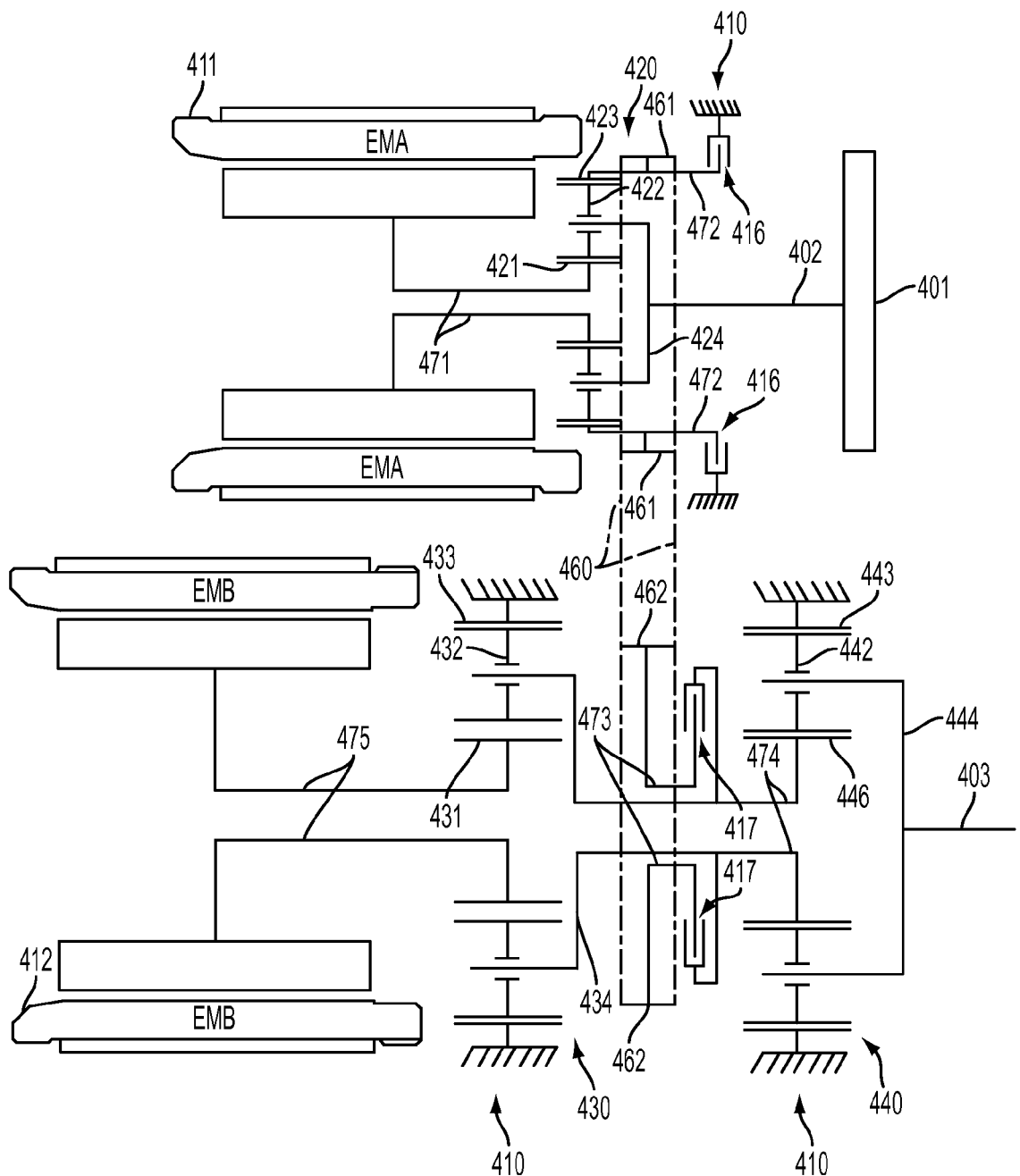
FIG. 4 is a schematic representation of yet another exemplary electrically variable drive unit according to the principles of the present disclosure.

FIG. 4 illustrates an example schematic representation of another exemplary electrically variable drive unit according to the principles of the present disclosure. An engine 401 is coupled to a transmission input shaft 402. The engine 401 may be any type of internal combustion engine or any other power source suitable for a vehicle. The transmission input shaft 402 is coupled to an input carrier 424 of an input planetary gear set 420. Input pinion gears 422 of the input planetary gear set 420 are rotatably mounted on the input carrier 424. The input pinion gears 422 are continuously meshed with an input sun gear 421 and an input ring gear 423 of the input planetary gear set 420. The input sun gear 421 is coupled by a shaft 471 to a first electric motor 411 ("EMA 411"). The engine 401 and EMA 411 are coaxial. The input ring gear 423 is coupled to an output chain driver gear 461.

Figure 8:
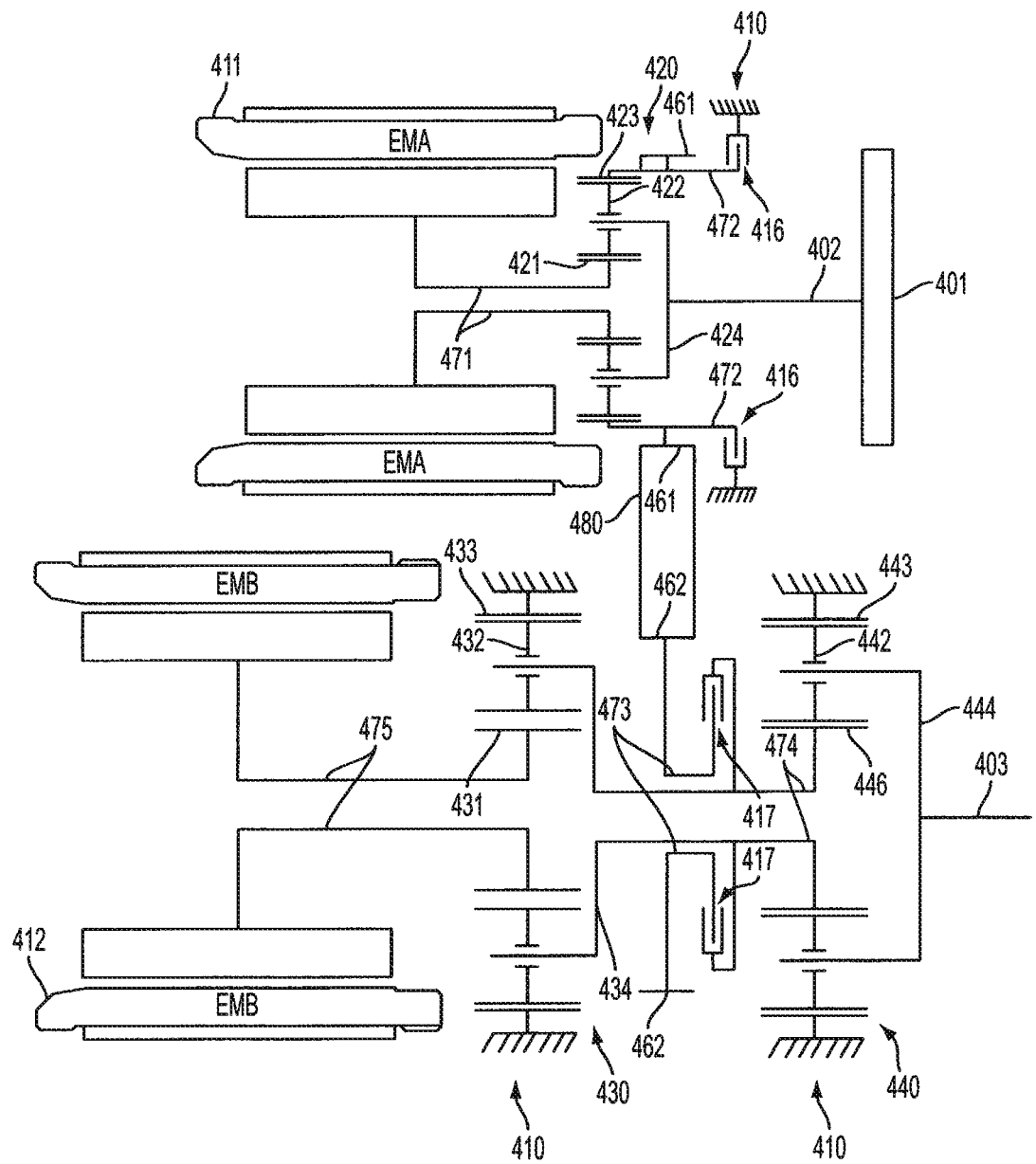
FIG. 8 is a schematic representation of yet another exemplary electrically variable drive unit according to the principles of the present disclosure.

A chain 460 couples the output chain driver gear 461 to an output chain driven gear 462. The chain 460 may be a belt or any other means of connecting the output chain driver gear 461 to the output chain driven gear 462. In one embodiment, the output chain driver gear 461 may be meshed with the output chain driven gear 462. In another embodiment, the output chain driver gear 461 may be coupled to the output chain driven gear 462 by a plurality of gears 480, as shown in FIG. 8. The output chain driver gear 461 is coupled by a shaft 472 to a first clutch assembly 416. The first clutch assembly 416 selectively couples the output chain driver gear 461 and, thereby, the chain 460 and output chain driven gear 462 to the drive unit housing 410.

The output chain driven gear 462 is coupled by a shaft 473 to a second clutch assembly 417. The second clutch assembly 417 selectively couples the shaft 473 and, thereby, output chain driven gear 462 to a shaft 474. Shaft 474 couples the second clutch assembly 417 to an EMB carrier 434 of an EMB planetary gear set 430. EMB pinion gears 432 of the EMB planetary gear set 430 are rotatably mounted on the EMB carrier 434. The EMB pinion gears 432 are continuously meshed with an EMB sun gear 431 and an EMB ring gear 433 of the EMB planetary gear set 430. The EMB ring gear 433 is non-rotatably coupled to the drive unit housing 410. The EMB sun gear 431 is coupled by a shaft 475 to a second electric motor 412 ("EMB 412").

The shaft 474 coupled to the second clutch assembly 417 is also coupled to an output sun gear 441 of an output planetary gear set 440. In one embodiment, the output planetary gear set 440 is on a first side of the chain 460 and the EMB planetary gear set 430 is on a second side of the chain 460. In another embodiment, the output planetary gear set 440 and the EMB planetary gear set 430 are on the same side of the chain 460. Output pinion gears 442 of the output planetary gear set 440 are continuously meshed with the output sun gear 441 and an output ring gear 443 of the output planetary gear set 40. The output ring gear 443 is non-rotatably coupled to the drive unit housing 410. The output pinion gears 442 are rotatably mounted on an output carrier 444 of the output planetary gear set 440. The output carrier 444 is coupled to an output shaft 403. The output shaft 403 may be coupled to vehicle wheels, a differential, or to any other desired component. The output shaft 403 and EMB 412 are coaxial.

To start the engine 401, the first clutch assembly 416 is activated, thereby, non-rotatably coupling the output chain driver gear 461 and shaft 472 to the drive unit housing 410. Thus, EMA 411 will cause the input sun gear 421 to rotate when EMA 411 is powered. Because the input sun gear 423 is non-rotatably fixed in place, the input pinion gears 422 and input carrier 424 will rotate causing the input shaft 402 to rotate, thereby, starting the engine 401.

The drive unit may be operated as purely electric drive unit in which EMB 412 provides propulsion ("EV mode"), as a series hybrid in which EMA 411 generates electricity and EMB 412 provides propulsion ("Series mode"), or as a parallel hybrid in which EMA 411 generates electricity and EMB 412 and the engine 401 provide propulsion ("Parallel mode"). To operate the drive unit in the EV mode, the second clutch assembly 417 is deactivated, thereby, permitting shaft 474 to rotate independently of shaft 473 and the output chain driven gear 462. EMB 412 is powered and rotates, thereby, causing the output shaft 403 to rotate. All power from EMB 412 passes to the output shaft 403. The first clutch assembly 416 may be either activated or deactivated.

To operate the drive unit in the Series mode, the first clutch assembly 416 is activated, thereby, non-rotatably coupling the output chain driver gear 461 and shaft 472 to the drive unit housing 410, and the second clutch assembly 417 is deactivated, thereby, permitting shaft 474 to rotate independently of shaft 473 and the output chain driven gear 462. The engine 401 is powered and rotates, thereby, causing the transmission input shaft 402 to rotate. All power from the engine 401 passes to EMA 411, thereby, generating electricity to charge the drive unit's batteries and to power EMB 412. EMB 412 is powered and rotates, thereby, causing the output shaft 403 to rotate. All power from EMB 412 passes to the output shaft 403.

To operate the drive unit in the Parallel mode, the first clutch assembly 416 is deactivated, thereby, permitting the output chain driver gear 461 and chain 460 to rotate, and the second clutch assembly 417 is activated, thereby, coupling shaft 474 to shaft 473 and the output chain driven gear 462. The engine 401 is powered and rotates, thereby, causing the transmission input shaft 402 to rotate. Some power from the engine 401 passes to EMA 411, thereby, generating electricity to charge the drive unit's batteries and to power EMB 412. The remainder of the power from the engine 401 is transferred to the output chain driver gear 461 and, thereby, the output shaft 403. EMB 412 is powered and rotates, thereby, causing the output shaft 403 to rotate.

In one embodiment, the drive unit may be used in a range-extended hybrid vehicle. The drive unit may be operated in a purely EV mode until its batteries are depleted and then switch to a series hybrid or parallel hybrid mode utilizing the engine 401. In one embodiment, the center of gravity of the drive unit is reduced by configuring EMB 412 on the same axis as the output shaft 403. This may improve vehicle handling performance and packaging ability of the drive unit. In one embodiment, the layout of EMA 411 and EMB 412 enables packaging of power electronics on top of the drive unit when installed in a vehicle. In one embodiment, the gearing between EMB 412 and the output shaft 403 achieves a gear reduction from EMB 412 to the output shaft. The gear reduction improves the ability of EMB 412 to power to vehicle. In one embodiment the gear reduction between EMB 412 and the output shaft 403 is approximately 9:1. In one embodiment, the gear ratio may be higher or lower.

Thus, a hybrid drive unit with better packaging and a lower center of gravity to improve vehicle handling and performance is provided. The hybrid drive unit features a simpler design than many prior art hybrid drive units.

What is claimed is:
1. A drive unit comprising,
a transmission input shaft;
an output shaft;

a first electric motor coaxial with said transmission input shaft;
a second electric motor coaxial with said output shaft;
an input planetary gear set coupled to said first electric motor;
an electric motor planetary gear set coupled to said second electric motor; and
an output planetary gear set coupled to said output shaft;
wherein said first electric motor and said input shaft are coupled to said second electric motor and said output shaft;
wherein said input planetary gear set comprises:
  an input carrier coupled to said transmission input shaft,
  a plurality of input pinion gears rotatably mounted on said input carrier,
  an input sun gear meshed with said plurality of input pinion gears and coupled to said first electric motor, and
  an input ring gear meshed with said plurality of input pinion gears and coupled to an output chain driver gear;
wherein said electric motor planetary gear set comprises:
  an electric motor carrier coupled to an output chain driven gear,
  a plurality of electric motor pinion gears rotatably mounted on said electric motor carrier,
  an electric motor sun gear meshed with said plurality of electric motor pinion gears and coupled to said second electric motor, and
  an electric motor ring gear meshed with said plurality of electric motor pinion gears and coupled to a drive unit housing;
wherein said output planetary gear set comprises:
  an output sun gear coupled to said output chain driven gear and said electric motor carrier;
  an output carrier coupled to said output shaft;
  a plurality of output pinion gears rotatably mounted on said output carrier and meshed with said output sun gear; and
  an output ring gear meshed with said plurality of output pinion gears and coupled to said drive unit housing; and
wherein said output chain driver gear and said output chain driven gear are coupled.

2. The drive unit of claim 1, wherein said output chain driver gear and said output chain driven gear are coupled by a chain or belt.

3. The drive unit of claim 2, wherein said electric motor planetary gear set is configured on a first side of said chain and said output planetary gear set is configured on a second side of said chain.

4. The drive unit of claim 2, wherein said electric motor planetary gear set and said output planetary gear set are configured on the same side of said chain.

5. The drive unit of claim 1, wherein said output chain driver gear and said output chain driven gear are meshed or coupled by at least one gear.

6. The drive unit of claim 5, wherein said electric motor planetary gear set and said output planetary gear set are configured on the same side of said gear.

7. The drive unit of claim 1, further comprising:
a first clutch assembly selectively coupling said output chain driver gear to said drive unit housing; and
a second clutch assembly selectively coupling said output chain driven gear to said electric motor carrier and said output sun gear.

8. The drive unit of claim 7, wherein said electric motor planetary gear set is configured on a first side of said chain and said output planetary gear set is configured on a second side of said chain.

9. A drive unit comprising:
a transmission input shaft;
an output shaft;
a first electric motor coaxial with said transmission input shaft;
a second electric motor coaxial with said output shaft;
an input planetary gear set having:
  an input carrier coupled to said transmission input shaft,
  a plurality of input pinion gears rotatably mounted on said input carrier,
  an input sun gear meshed with said plurality of input pinion gears and coupled to said first electric motor, and
  an input ring gear meshed with said plurality of input pinion gears and coupled to an output chain driver gear;
an output planetary gear set having:
  an output carrier coupled to said output shaft,
  an output sun gear coupled to an output chain driven gear,
  a plurality of output pinion gears meshed with said output sun gear and rotatably mounted on said output carrier, and
  an output ring gear meshed with said plurality of output pinion gear and coupled to a drive unit housing;
an output driver gear coupled to said second electric motor; and
an output driven gear meshed with said output driver gear and coupled to said output carrier and said output shaft,
wherein said output chain driver gear and said output chain driven gear are coupled by a chain or belt; and
wherein said first electric motor and said input shaft are coupled to said second electric motor and said output shaft.

10. A hybrid transmission comprising:
a transmission input shaft;
an output shaft;
a first electric motor coaxial with said transmission input shaft;
a second electric motor coaxial with said output shaft;
an input planetary gear set having:
  an input carrier coupled to said transmission input shaft,
  a plurality of input pinion gears rotatably mounted on said input carrier,
  an input sun gear meshed with said plurality of input pinion gears and coupled to said first electric motor, and
  an input ring gear meshed with said plurality of input pinion gears and coupled to an output chain driver gear;
an electric motor planetary gear set having:
  an electric motor carrier coupled to an output chain driven gear,
  a plurality of electric motor pinion gears rotatably mounted on said electric motor carrier,
  an electric motor sun gear meshed with said plurality of electric motor pinion gears and coupled to said second electric motor, and
  an electric motor ring gear meshed with said plurality of electric motor pinion gears and coupled to a transmission housing; and
an output planetary gear set having:
  an output sun gear coupled to said output chain driven gear and said electric motor carrier;
  an output carrier coupled to said output shaft,
  a plurality of output pinion gears rotatably mounted on said output carrier and meshed with said output sun gear, and an output ring gear meshed with said plurality of output pinion gears, wherein said output chain driver gear is coupled to said output chain driven gear.

11. The hybrid transmission of claim 10, further comprising:
   a first clutch assembly selectively coupling said output chain driver gear to said transmission housing; and
   a second clutch assembly selectively coupling said output chain driven gear to said electric motor carrier and said output sun gear.

12. The hybrid transmission of claim 10, wherein said output chain driver gear and said output chain driven gear are coupled by a chain or belt.

13. The hybrid transmission of claim 12, wherein said electric motor planetary gear set is configured on a first side of said chain and said output planetary gear set is configured on a second side of said chain.

14. The hybrid transmission of claim 12, wherein said electric motor planetary gear set and said output planetary gear set are configured on the same side of said chain.

15. The hybrid transmission of claim 10, wherein said output chain driver gear and said output chain driven gear are coupled by at least one gear.

16. The hybrid transmission of claim 15, wherein said electric motor planetary gear set is configured on a first side of said gear and said output planetary gear set is configured on a second side of said gear.

17. The hybrid transmission of claim 15, wherein said electric motor planetary gear set and said output planetary gear set are configured on the same side of said gear.

\* \* \* \* \*